US011907906B2

(12) United States Patent
Clark

(10) Patent No.: US 11,907,906 B2
(45) Date of Patent: Feb. 20, 2024

(54) SHARED CONTENT SIMILARITY ANALYSES

(71) Applicant: Hewlett-Packard Development Company, L.P., Spring, TX (US)

(72) Inventor: Alexander Wayne Clark, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 13 days.

(21) Appl. No.: 17/049,104

(22) PCT Filed: Aug. 30, 2018

(86) PCT No.: PCT/US2018/048700
§ 371 (c)(1),
(2) Date: Oct. 20, 2020

(87) PCT Pub. No.: WO2020/046306
PCT Pub. Date: Mar. 5, 2020

(65) Prior Publication Data
US 2021/0250390 A1 Aug. 12, 2021

(51) Int. Cl.
*G06Q 10/101* (2023.01)
*G06F 16/48* (2019.01)
(Continued)

(52) U.S. Cl.
CPC ........... *G06Q 10/101* (2013.01); *G06F 16/48* (2019.01); *G06F 18/22* (2023.01); *G06F 21/10* (2013.01);
(Continued)

(58) Field of Classification Search
CPC ....... H04L 65/403; G06F 16/48; G06F 40/30; G06F 18/22; G06K 9/6215; G06N 3/04
See application file for complete search history.

(56) References Cited

U.S. PATENT DOCUMENTS 8,904,295 B2 * 12/2014 Whalin ................. H04W 4/021 715/753
9,654,425 B2 * 5/2017 Heiferman .......... H04L 12/1818
(Continued)

FOREIGN PATENT DOCUMENTS

CN 104956642 A 9/2015
WO WO-2018209254 A1 * 11/2018 ......... G06F 16/9535

OTHER PUBLICATIONS

Chang et al., "Finding Event-Relevant Content from the Web Using a Near-Duplicate Detection Approach" 2007 IEEE/WIC/ACM International Conference on Web Intelligence, pp. 291-294.
(Continued)

*Primary Examiner* — Kristie D Shingles
(74) *Attorney, Agent, or Firm* — Quarles & Brady LLP

(57) ABSTRACT

In one example in accordance with the present disclosure, a content tracking system is described. A network interface of the system couples the content tracking system to multiple computing devices. A content interceptor intercepts content shared during a collaborative meeting. A content analyzer analyzes shared content to determine a topic of the shared content and a content comparer identifies similarities between shared content of different collaborative meetings. An interface of the content tracking system provides a recommendation to at least one user participating in at least one of the different collaborative meetings based on an output of the content comparer.

20 Claims, 7 Drawing Sheets

312-1 314-1
312-2 314-2
312-3 314-3
312-4 314-4
312-5 314-5
312-6 314-6
416-1
416-2
518
100

(51) Int. Cl.

| | |
|---|---|
| ***G06F 40/30*** | (2020.01) |
| ***G06N 3/04*** | (2023.01) |
| ***H04L 65/403*** | (2022.01) |
| ***H04L 65/611*** | (2022.01) |
| ***G06F 18/22*** | (2023.01) |
| ***G06F 21/10*** | (2013.01) |

(52) U.S. Cl.

CPC ............... *G06F 40/30* (2020.01); *G06N 3/04* (2013.01); *H04L 65/403* (2013.01); *H04L 65/611* (2022.05)

(56) References Cited

U.S. PATENT DOCUMENTS

| | | | | |
|---|---|---|---|---|
| 9,749,367 | B1 * | 8/2017 | Kirby | G06Q 10/101 |
| 10,223,438 | B1 * | 3/2019 | Xu | G06F 16/285 |
| 10,244,286 | B1 * | 3/2019 | Jia | H04N 21/6582 |
| 10,263,799 | B1 * | 4/2019 | Jouhikainen | G06Q 10/00 |
| 10,594,757 | B1 * | 3/2020 | Shevchenko | H04L 67/306 |
| 11,038,974 | B1 * | 6/2021 | Koukoumidis | G06F 40/30 |
| 2007/0028303 | A1 | 2/2007 | Brennan | |
| 2007/0061373 | A1 | 3/2007 | Kilday | |
| 2009/0210351 | A1 | 8/2009 | Bush et al. | |
| 2009/0249482 | A1 | 10/2009 | Sarathy | |
| 2009/0307045 | A1 | 12/2009 | Chakra et al. | |
| 2010/0212010 | A1 | 8/2010 | Stringer et al. | |
| 2011/0131144 | A1 | 6/2011 | Ashour et al. | |
| 2013/0042294 | A1 | 2/2013 | Colvin et al. | |
| 2014/0129576 | A1 | 5/2014 | Bank et al. | |
| 2014/0149505 | A1 | 5/2014 | Christiansen | |
| 2018/0046957 | A1 * | 2/2018 | Yaari | G06Q 10/1095 |
| 2018/0101281 | A1 * | 4/2018 | Nelson | G06F 3/0482 |
| 2018/0176268 | A1 * | 6/2018 | Malatesha | H04L 67/53 |
| 2019/0088153 | A1 * | 3/2019 | Bader-Natal | H04N 7/147 |
| 2019/0102722 | A1 * | 4/2019 | Chetlur | G06Q 10/06398 |
| 2019/0273767 | A1 * | 9/2019 | Nelson | H04M 7/0027 |
| 2021/0271823 | A1 * | 9/2021 | De Ridder | G06N 5/04 |

OTHER PUBLICATIONS

More context-aware in partnership with Microsoft; Microsoft Build: Modern Meetings Demo, https://www.youtube.com/watch?v=ddb3ZgAp9TA, May 8, 2018.

* cited by examiner

SHARED CONTENT SIMILARITY ANALYSES

BACKGROUND

Organizations are becoming increasingly more dynamic with groups of individuals assigned to different projects and/or tasks. An organization may have tens, or in some cases hundreds, of such groups that collaborate together with a common objective in mind. Often times these users meet together and share electronic content such as slide presentations, videos, etc. relating to the subject matter of the group to which they are assigned.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
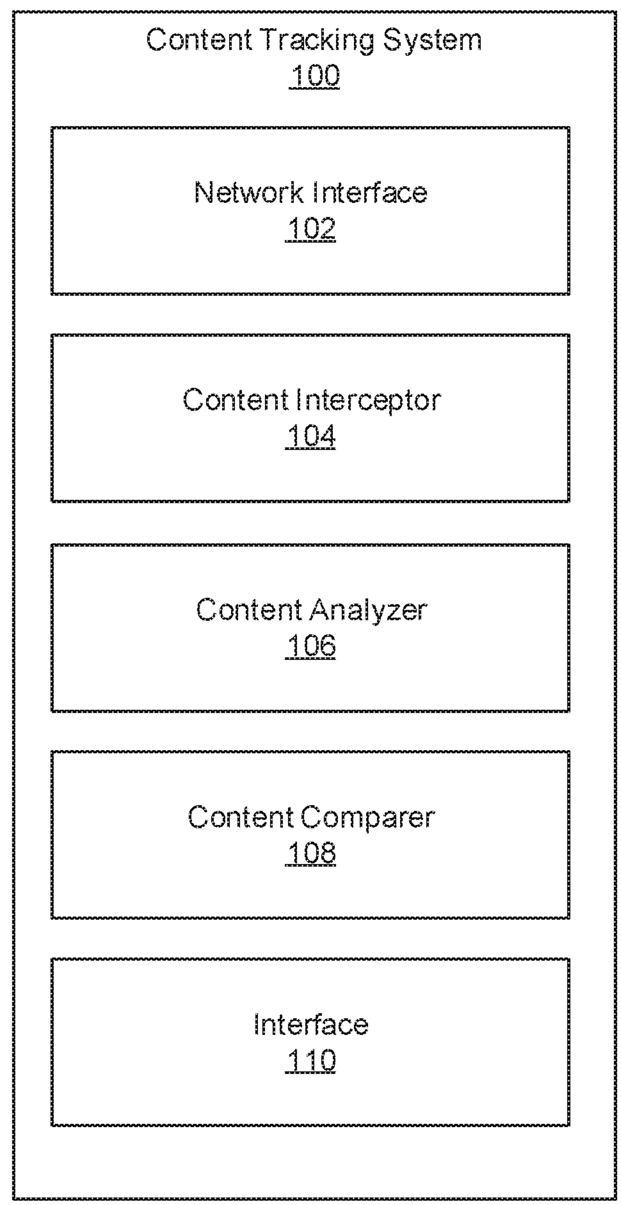
FIG. 1 is a block diagram of a system for shared content similarity analysis, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Organizations are becoming increasingly more dynamic with groups of individuals assigned to different projects and/or tasks. An organization may have tens, or in some cases hundreds, of such groups that collaborate together with a common objective in mind. Often times these users meet together and share electronic content such as slide presentations, videos, etc. relating to the subject matter of the group to which they are assigned.

While the intent of these groups may be admirable, sometimes the operations of the various groups can lead to inefficiencies. For example, it can be difficult to find the right subject matter experts or stay aligned with all the conversations taking place within a large organization. Moreover, it may be the case that efforts of a group may be duplicative, redundant, and/or impeded by the efforts of other groups. For example, two different groups may have a workload that overlaps with one another. Accordingly, the developments of one group may overlap with the developments of another group such that the groups are redundantly addressing the same issue, or redundantly developing a product.

In another example, two groups may be developing different components of a larger system. The developments by one group may cause development/compatibility issues with the developments by the other group. These complications and others find their root in the fact that the operation, and sharing of content, within these groups may be isolated with little connection and/or collaboration between various groups. In other examples, the groups that are working on a similar topic may not even be aware of the existence of another group with a similar objective.

Accordingly, the present specification describes a system and method for identifying groups that could benefit from inter-group collaboration. Specifically, the present specification describes a system that analyzes content such as multimedia shared in a collaborative meeting. Such analysis is done for different collaborative meetings within an organization. The content for different meetings is compared, and similarities and discrepancies are identified between the shared content. If the shared content is sufficiently similar, a recommendation is provided to members of the different groups. For example, if it is determined that two groups within an organizations have identified a particular issue and have called a meeting where content will be shared related to the issue, the system may analyze the shared content, determine that each group is addressing the same issue, and provide a recommendation such as indicating to the groups that the other group is working on the same issue, and encouraging the groups to collaborate together to more efficiently address the issue and reduce an effort redundancy in addressing the issue.

Specifically, the present specification describes a content tracking system. The system includes a network interface to couple the content tracking system to multiple computing devices. A content interceptor of the system intercepts content shared during a collaborative meeting and a content analyzer analyzes the shared content to determine a topic of the shared content. A content comparer identifies similarities between shared content of different collaborative meetings. An interface of the content tracking system provides a recommendation to at least one user participating in at least one of the different collaborative meetings based on an output of the content comparer.

The present specification also describes a method. According to the method, content shared during a collaborative meeting is intercepted and analyzed to determine a topic for the shared content. Similarities between shared content of different collaborative meetings are identified. A recommendation is then provided to at least one user participating in at least one of the different collaborative meetings based on identified similarities between the shared content of the at least one different collaborative meeting and the shared content of the collaborative meeting.

The present specification also describes a tangible machine-readable storage medium encoded with instructions executable by a processor. The machine-readable storage medium includes instructions to intercept, at a computing device, content shared via another computing device during a collaborative meeting and analyze the shared content. The machine-readable storage medium also includes instructions to determine differences between the shared content of the collaborative meeting and shared content of other collaborative meetings, to determine similarities between the shared content of the collaborative meeting and shared content of other collaborative meetings, and to determine that the collaborative meeting relates to a same topic as at least one of the other collaborative meetings based on a threshold degree of similarity between respective shared content. The machine-readable storage medium also includes instructions to provide participants in at least one of the collaborative meeting and the at least one other collaborative meeting with a recommendation based on a determined similarity.

In summary, using such a content tracking system 1) allows for effective identification of related collaborative groups; 2) facilitates coordinated efforts of related collaborative groups; 3) more effectively manages the efforts of multiple collaborative groups; and 4) promotes more effective collaboration and the attendant business ideals such collaboration espouses.

Turning now to the figures, FIG. 1 is a block diagram of a system (100) for shared content similarity analysis, according to an example of the principles described herein. The content tracking system (100) includes a network interface (102) to couple the content tracking system (100) to multiple computing devices. That is, the content tracking system (100) has the ability to intercept shared content from a number of different computing devices. To intercept such content, the computing devices from which content is shared are coupled to the content tracking system (100) via a network interface (102).

The network interface (102) may be of a variety of types including a physical wired connection or a wireless connection. As will be described in connection with FIGS. 3-5, the environment in which the content tracking system (100) is implemented may vary, with a constant being that a large network of computing devices are used within an organization and are used to share content with other computing devices of users within a collaborative group. As content is shared among these computing devices, they share a connection across a network. The content tracking system (100) also has a network interface (102) to be coupled to, and facilitate content interception from these various computing devices.

The content tracking system (100) also includes a content interceptor (104) to intercept content that is shared during a collaborative meeting. That is, during collaborative meetings of group of individuals, content may be shared. As a specific example, a particular individual in a group may share a slide presentation. In so doing, the individual either shares the content on their own computing device or through a conferencing computing device. In either example, the content interceptor (104) collects this shared content.

The shared content may be of a variety of types. For example, the content interceptor (104) may intercept a video presentation, an audio presentation, a textual presentation, and/or a multimedia presentation. In other examples, the content interceptor (104) may intercept captured content from the collaborative meeting. For example, the content interceptor (104) may capture a video and/or audio recording of the collaborative meeting. While particular reference is made to specific content that is shared and captured, different forms, or types of content may be shared and intercepted. In examples where multiple types, or formats, of content is shared in a collaborative meeting, the content interceptor (104) captures the multiple formats. That is, a user may share a multimedia presentation as well as a video presentation. Moreover, the collaborative meeting may be video-recorded. In this example, the content interceptor (104) intercepts the multimedia presentation, the video presentation, and the video capture of the collaborative meeting.

In some examples, the content that is intercepted is streamed during the collaborative meeting. That is, the content that is analyzed is not necessarily the content that is intended to be presented during a meeting, but the actual content that is presented. Analyzing the content that is actually presented, and not just that which is intended to be presented, increases the determination of content similarity. That is, by analyzing that material which is actually presented, or shared, a determination regarding similarity is based on what a particular group deems as most relevant, for example based on what is actually shared, and how much time is dedicated to that content.

Content intercept is facilitated by the network connection of the various multiple devices. That is, because computing devices are connected via a network and because the content tracking system (100) has a network interface (102) coupling the content tracking system (100) to this network of computing devices, the content interceptor (104) has access to this content that is shared during a collaborative meeting.

A content analyzer (106) of the content tracking system (100) analyzes the shared content to determine a topic for the shared content. The content analyzer (106) may include any sort of recognition component. That is, the content analyzer (106) may include an image recognizer to determine a topic relating to a particular image. Other examples of components of the content analyzer (106) include a textual recognition component and a voice recognition component. These components can analyze a particular format of content and determine from that analysis what is being shared. For example, presume an engineer presents a multimedia presentation relating to an automobile component, which presentation includes images and videos of the automobile component. An image and/or video recognition component of the content analyzer (106) may analyze characteristics of this photo to determine that the image is related to the automobile component. Such information may be used in classifying the collaborative meeting and be used to determine which other collaborative meetings are also associated with, or relate to, the automobile component.

One particular example of an image/video recognition component is provided as follows. In this example, the content analyzer (106) may access a database with a corpus of images/videos. The corpus may include a set of "positive" images that depict an image of a particular subject. The corpus may also include a set of "negative" images that do not depict the image of the particular subject. The image/video recognition component can use characteristic collected from this corpus and compare characteristics of a particular image of a collaborative meeting presentation to determine whether images in the collaborative meeting presentation are of the particular subject.

The content analyzer (106) may be a neural network to determine based on a corpus of the data, a subject matter of the shared content. For example, returning to the above example, presuming a particular presentation has image(s) of an automobile component. The content analyzer (106) may analyze a corpus of images which include images that have been identified as depicting the automobile component and images that have been definitively identified as not depicting the automobile component. By analyzing characteristics of the collaborative meeting image(s) and the database, the content analyzer (106) may determine that there is enough similarity between the positive images and the images of the collaborative meeting presentation to determine that the collaborative meeting presentation relates to the topic of the automobile component.

Similar analyses with other formats of content may also be performed by the content analyzer (106). Combining the results of the analysis of various types of content in a collaborative meeting, a topic of the current collaborative meeting may be ascertained.

In addition to this trained type of machine learning, the neural network could be unsupervised. An unsupervised neural network trains itself to learn new images over time by finding similarities in image features. For instance, if a company was working on development of a new product, the neural net system would eventually recognize it over time, even if it had not specifically been supplied positive images of that product. That is, the neural network would simply lay, or cascade, layers of image feature information that collectively marks similarities between different types of images.

The content tracking system (100) also includes a content comparer (108) to identify similarities between shared content of different collaborative meetings. That is, content analysis is performed for various collaborative meetings, and the results of such analysis is compared to one another. Put another way, the results of content analysis of a first collaborative meeting may result in machine-readable instructions. These results can be compared with the analysis output for another collaborative meeting. The comparison may indicate similarities between the various meetings and a corresponding notification/recommendation may be generated.

In some examples, the content comparer (108) compares content across format types. That is, the content comparer (108) may compare the analysis results for a video presentation against analysis results of a multimedia presentation, or even the video capture of a collaborative meeting. The content comparer (108) may do so as the analysis results are converted to a consistent format, such as a machine-readable format.

An example of content comparison is now provided. In this example, a first group may include elementary school teachers that have identified, and are attempting to address, low math test scores for first grade students and a second group may include elementary school teachers that have identified, and are attempting to address, low math test scores for second grade students. As a lack of collaboration between the groups may lead to either group addressing the issue in different, and possibly conflicting ways, group collaboration may be desired.

In this example, the first group has a meeting where a particular group member inserts a portable memory storage device into a conferencing computing device and shares a multimedia presentation with graphics and text. In this example, the content interceptor (104) intercepts the presentation content and the content analyzer (106) performs graphic and textual analysis and outputs results in a particular format. Similarly, the second group has a meeting where a particular group member records the video of the meeting. In this example, the content interceptor (104) intercepts the video captured and the content analyzer (106) performs video graphic analysis and outputs results in the same format. The content comparer (108) may then analyze the results to determine similarities between the topics of the meetings, i.e., that they relate to low test scores of students. The content comparer (108) may also determine discrepancies between the topics of the meetings, i.e., that they relate to different grade levels.

An interface (110) of the content tracking system (100) then provides a recommendation to at least one user participating in at least one of the different collaborative meetings based on an output of the content comparer (108). Specifically, the interface (110) may note to at least one user in the first group and/or at least one user in the second group, that another group exists that is researching a similar topic and that collaboration between the groups may be beneficial and more effective.

The interface (110) may present the notifications and recommendations in any form. For example, a notice may be text and/or audio. The notifications and recommendations may also be to a variety of degrees. For example, the recommendation may simply indicate that someone else is discussing a similar, or the same, topic. In another example, the recommendation may identify the topic that is shared, the discrepancies between the shared content, and the individuals in the other group. For example, the recommendation may state that "a group of second grade teachers is also discussing low test scores at the school, perhaps they may have insight as to how to address this issue." Thus, the present specification describes a system (100) that determines when collaborative groups, who may be unaware of each other, are discussing and presenting content related to the same topic. The content tracking system (100) can then provide a notification to the relevant individuals, thus potentially avoiding duplicated, overlapping, redundant, and/or conflicting work between the groups.

Figure 2:
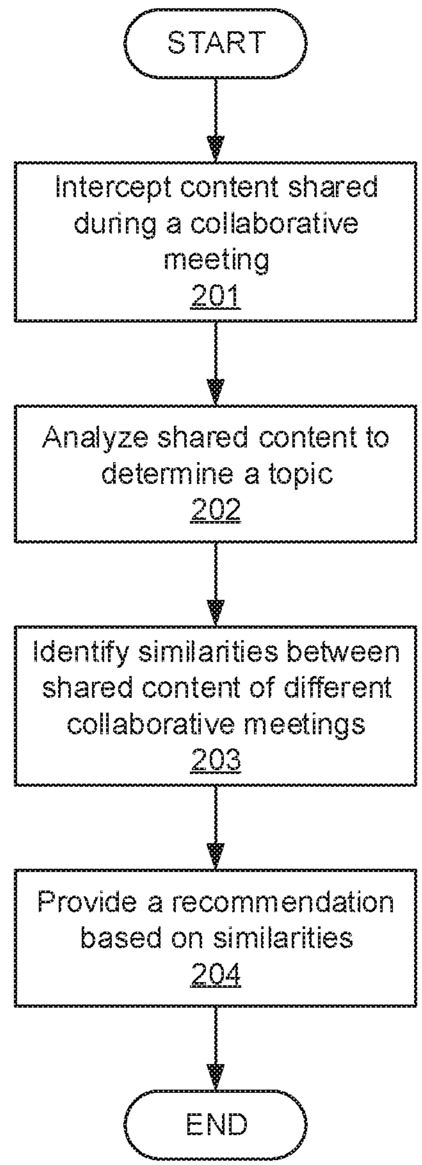
FIG. 2 is a flow chart of a method for shared content similarity analysis, according to an example of the principles described herein.

FIG. 2 is a flow chart of a method (200) for shared content similarity analysis, according to an example of the principles described herein. According to the method (200), content shared during a particular collaborative meeting is intercepted (block 201). That is, via a network interface (FIG. 1, 102), content that is shared during a collaborative meeting is accessible by the content tracking system (FIG. 1, 100). As described above, the shared content may be of a variety of types and may come from a variety, and multiple sources. For example, multiple users may present content at different times during the collaborative meeting. In a particular example, the intercepted (block 201) content may be the voices of different group members in a recorded meeting.

The intercepted content is then analyzed (block 202) to determine a topic. That is, the content analyzer (FIG. 1, 104) may include different media analyzers and classifiers to determine what topic/subject the particular media analyzed relates to and to classify the content as such. As described above, such analysis (block 202) may be of a variety of media formats and types. As such, the content analyzer (FIG. 1, 104) may include a variety of analyzers to analyze the different formats and types. Moreover, as described above, in some examples the content analyzer (FIG. 1, 104) includes a neural network analyzer or deep learning analyzer to analyze the content from a database of information collected over time.

The content tracking system (FIG. 1, 100) can then identify (block 203) similarities between the shared content of different collaborative meetings. That is, the output of the content analyzer (FIG. 1, 106) is passed to a content comparer (FIG. 1, 108) which compares the analysis results, regardless of the format and type of content that is analyzed, to determine similarity. In one specific example, such a similarity may be found when different collaborative meetings have images, videos, and/or text relating to weather patterns in a particular state. If the shared content from different collaborative meetings have a threshold degree of similarity, the shared content of that different collaborative meeting may be identified as being similar to the shared content of the current collaborative meeting.

For example, a first collaborative meeting within an organization may have shared content that relates to technical specifications for an automobile and a second collaborative meeting within the organization may have shared content that relates to technical specifications for a motorcycle. While the two collaborative meetings may have the identified (block 203) similarities of technical specifications, the similarities may not be significant enough, on account of one being for an automobile and the other for being for a motorcycle, to justify classifying these meetings as similar and providing a corresponding recommendation.

However, in another example, a first collaborative meeting may relate to revisions to an exhaust system of a motorcycle and a second collaborative meeting may relate to revisions to an engine of the motorcycle. The presentations of these meetings may have enough similar content, i.e., cross-references of similar content, that the content tracking system (FIG. 1, 100) identifies the shared content as similar and to provide an appropriate recommendation and/or notification.

With similarity detected, a recommendation is provided (block 204) based on the similarities. For example, users in either collaborative group may be notified that another group of users is addressing the same topic. In some examples, the recommendation is provided (block 204) in real time, that is during at least one of the different collaborative meetings. That is, the operation of the content tracking system (FIG. 1, 100) to intercept, analyze, and compare shared content may occur as a presentation is being made, or as a collaborative meeting is taking place. Doing so provides a real-time, up-to-date indication to users of collaborative opportunities with others. Accordingly, in this example, a user from the other group could be invited to the present collaborative meeting to discuss the topic.

Figure 3:
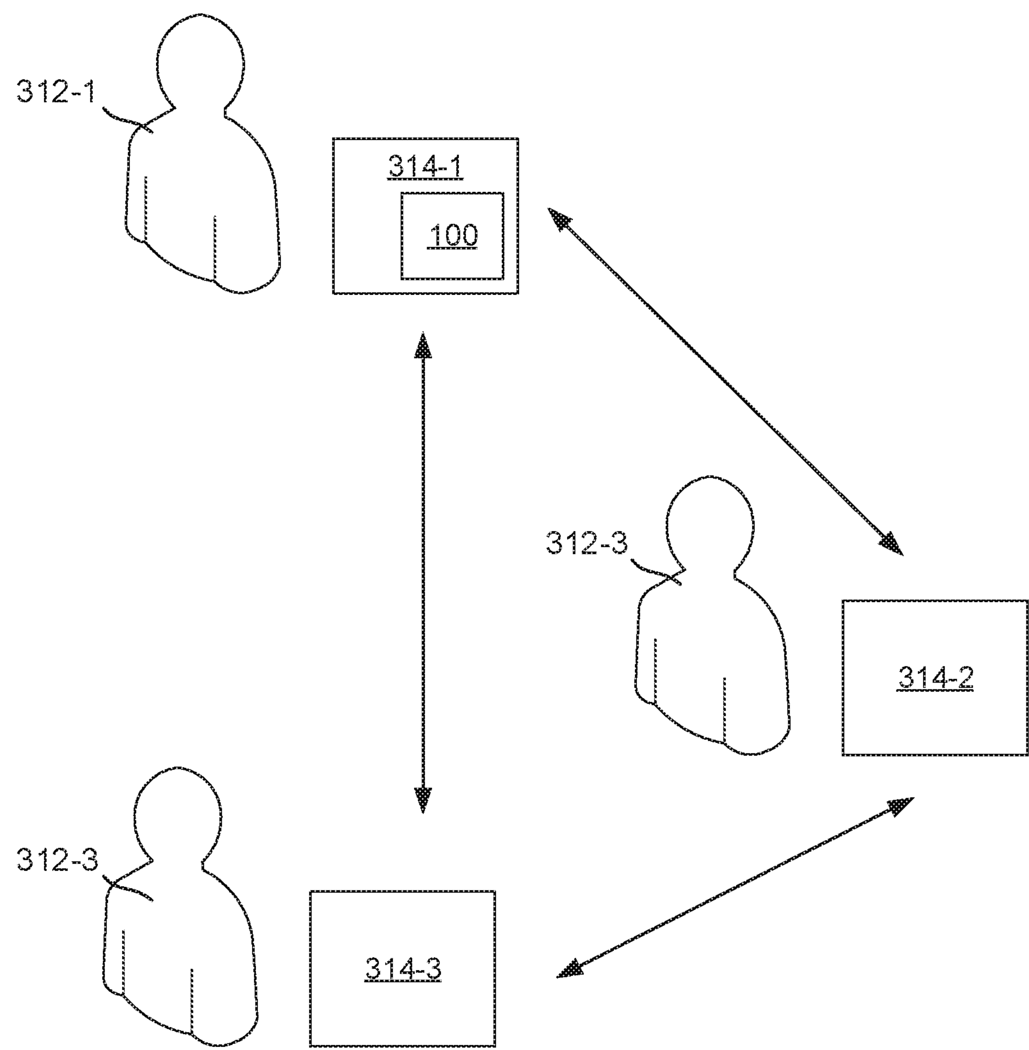
FIG. 3 is a diagram of an environment for shared content similarity analysis, according to an example of the principles described herein.

FIG. 3 is a diagram of an environment for shared content similarity analysis, according to an example of the principles described herein. In the example depicted in FIG. 3, a collaborative group includes three users (312-1, 312-2, 312-3). However, a collaborative group may include any number of users (312). As described above, each computing device (314) associated with users (312) of the collaborative group is connected via a network connection such as a wireless network or a wired network.

In this example, the content tracking system (100) is disposed on a computing device (314) of a user (312) participating in the collaborative meeting. That is, in this example a first user (312-1) may bring a portable computing device (314-1) such as a laptop ora tablet into a room where a presentation regarding a particular topic is to be made. The first user (312-1) may, either on the computing device (314-1) itself, or through a projector, display or present the content. As described above, the content may include captures of the collaborative meeting. Accordingly, the computing device (314-1) may include the components to capture such audio or visual signals. The content interceptor (FIG. 1, 104) captures the shared content, and the content analyzer (FIG. 1, 106) analyzes it to determine a topic and/or subject. In the example where the content tracking system (100) is disposed on the first user computing device (314-1), the content interceptor (FIG. 1, 104) captures just that content that is shared on the first computing device (314-1) where the content tracking system (100) is installed.

In this example, the content analyzer (FIG. 1, 106) may be in communication with a database that is either remote or local to the first computing device (314-1), which database includes the content to which the shared content is compared to determine a topic and/or subject of the collaborative meeting.

Then, as described above, a content comparer (FIG. 1, 108) compares the outputs of the analysis of the shared content from the current collaborative meeting with outputs of the analysis of shared content from other collaborative meetings to determine a similarity therebetween. In this example, the content comparer (FIG. 1, 108) may be in communication with a database that is either remote or local to the first computing device (314-1), which database includes the outputs of analyses of shared content of other collaborative meetings. The first computing device (314-1) also includes the interface (FIG. 1, 110) through which an indication of similarity, notifications, and/or recommendations can be presented.

Figure 4:
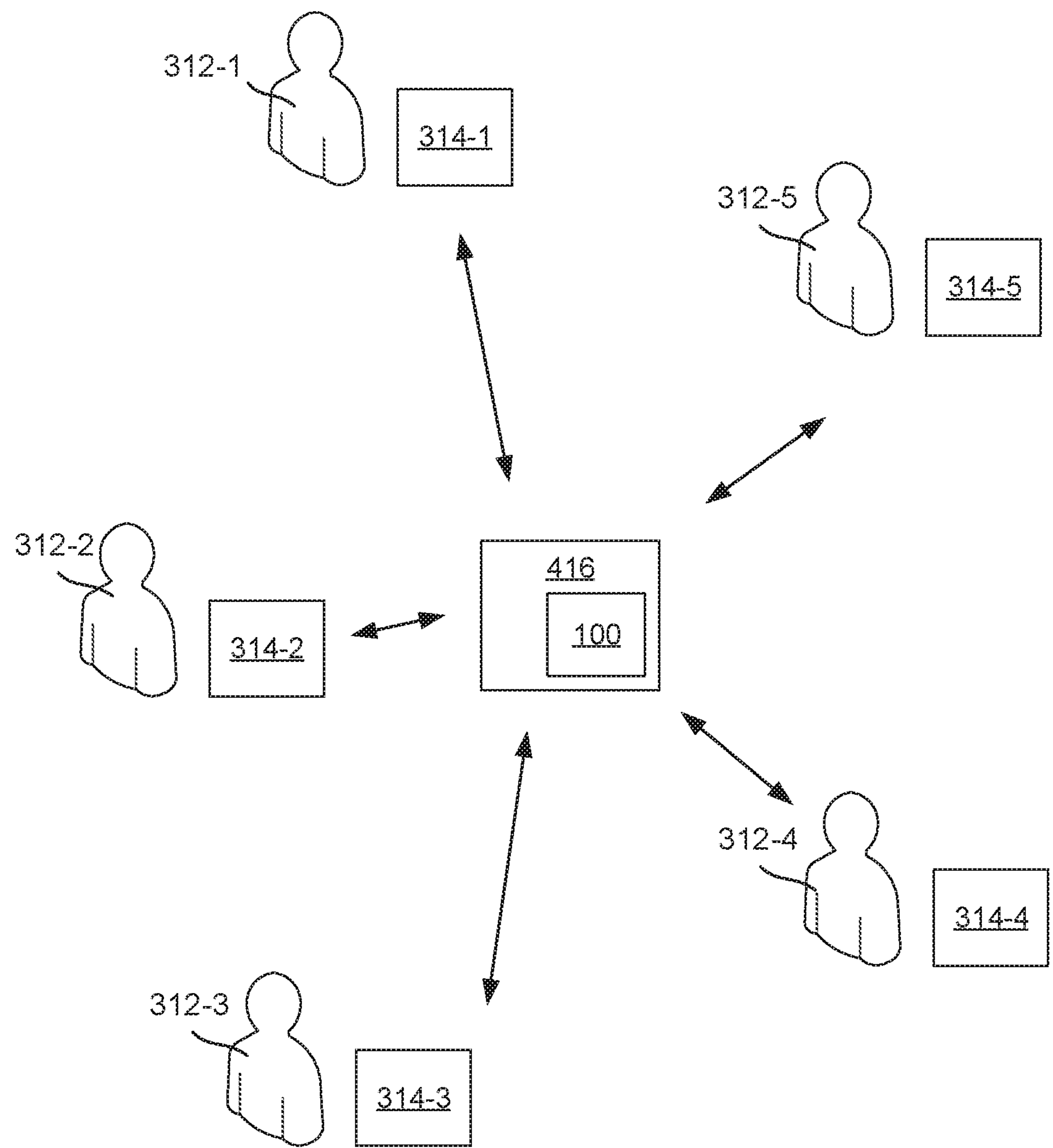
FIG. 4 is a diagram of an environment for shared content similarity analysis, according to another example of the principles described herein.

FIG. 4 is a diagram of an environment for shared content similarity analysis, according to an example of the principles described herein. In the example depicted in FIG. 4, a collaborative group includes five users (312-1, 312-2, 312-3, 312-4, 312-5). However, a collaborative group may include any number of users (312). As described above, each computing device (314) associated with users (312) of the collaborative group is connected via a network connection such as a wireless network or a wired network.

In this example, the content tracking system (100) is disposed on a conferencing computing device (416). The shared content may be shared directly from the conferencing computing device (416) or shared indirectly from a user device (314) that is coupled to the conferencing computing device (416). For example, a first user (312-1) may connect a first computing device (314-1) to the conferencing computing device (416). In this example, the first user (312-1) then presents the content. The content interceptor (FIG. 1, 104) captures the shared content, and the content analyzer (FIG. 1, 106) analyzes it to determine a topic and/or subject. In the example where the content tracking system (100) is disposed on a conferencing computing device (416), the content interceptor (FIG. 1, 104) captures content that is shared on any of the multiple computing devices (314) coupled to the content tracking system (100) during the collaborative meeting. For example, during a collaborative meeting, any one of the computing devices (314-1, 314-2, 314-3, 314-4, 314-5) may be coupled to a display of the conferencing computing device (416) such that the associated user may share content. Accordingly, the content tracking system (100) in this example captures all content shared through the conferencing computing device (416).

In this example, the content analyzer (FIG. 1, 106) may be in communication with a database that is either remote or local to the conferencing computing device (416), which database includes the content to which the shared content is compared to determine a topic and/or subject of the collaborative meeting.

Then, as described above, a content comparer (FIG. 1, 108) compares the outputs of the analysis of the shared content from the current collaborative meeting with outputs of the analysis of shared content from other collaborative meetings to determine a similarity therebetween. In this example, the content comparer (FIG. 1, 108) may be in communication with a database that is either remote or local to the conferencing computing device (416), which database includes the outputs of analyses of shared content of other collaborative meetings, either through the conferencing computing device (416) or other conferencing computing devices (416). The conferencing computing device (416) also includes the interface (FIG. 1, 110) through which an indication of similarity, notifications, and/or recommendations can be presented. In some examples, the notification, indication, and/or recommendation may be passed through the conferencing computing device (416) to any one, or multiple of, the user computing devices (314).

Figure 5:
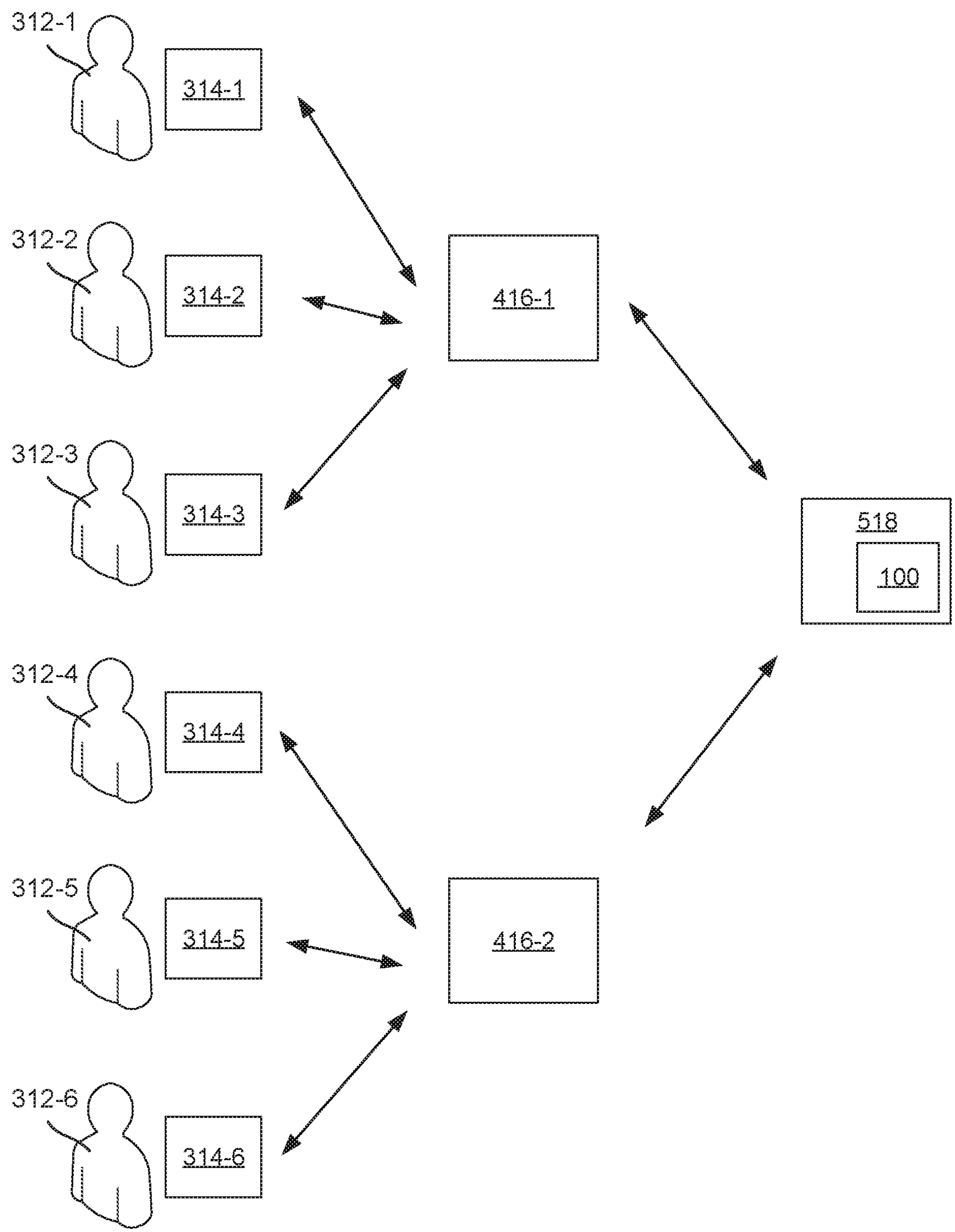
FIG. 5 is a diagram of an environment for shared content similarity analysis, according to another example of the principles described herein.

FIG. 5 is a diagram of an environment for shared content similarity analysis, according to an example of the principles described herein. In the example depicted in FIG. 5, two different collaborative groups of three users (312-1, 312-2, 312-3, 312-4, 312-5, 312-6) are depicted. However, a collaborative group may include any number of users (312). As described above, each computing device (314) associated with users (312) of the collaborative group is connected via a network connection such as a wireless network or a wired network.

In this example, the content tracking system (100) is disposed on a server (518) that is coupled to multiple conferencing computing devices (416-1, 416-2). In some examples, the server (518) may be located off-site. In other examples, the server (518) may be on-site, that is within the physical space of the organization. The server (518) may provide additional processing power to analyze and compare the shared content of various collaborative meetings.

In this example, the shared content may be shared directly from the conferencing computing device (416) or shared indirectly from a user device (314) that is coupled to the conferencing computing device (416). For example, a first user (312-1) may connect a first computing device (314-1) to the first conferencing computing device (416-1). In this example, the first user (312-1) then presents the content. The content interceptor (FIG. 1, 104) captures the shared content from the first conferencing computing device (416-1), and the content analyzer (FIG. 1, 106) analyzes it to determine a topic and/or subject. In the example where the content tracking system (100) is disposed on a server (518), the content interceptor (FIG. 1, 104) captures content that is shared on any of the multiple conferencing computing devices (416-1, 416-2) coupled to the content tracking system (100) during the collaborative meeting. Accordingly, the content tracking system (100) in this example captures all content shared through the multiple conferencing computing devices (416-1, 416-2).

In this example, the content analyzer (FIG. 1, 106) may be in communication with a database that is either remote or local to the server (518), which database includes the content to which the shared content is compared to determine a topic and/or subject of the collaborative meeting.

Then, as described above, a content comparer (FIG. 1, 108) compares the outputs of the analysis of the shared content from the current collaborative meeting with outputs of the analysis of shared content from other collaborative meetings to determine a similarity therebetween. In this example, the content comparer (FIG. 1, 108) may be in communication with a database that is either remote or local to the server (518), which database includes the outputs of analyses of shared content of other collaborative meetings, either through conferencing computing devices (416) or other conferencing computing devices. The server (518) also provides the interface (FIG. 1, 110) through which an indication of similarity, notifications, and/or recommendations can be presented. In some examples, the notification, indication, and/or recommendation may be passed through the conferencing computing device (416) to any one, or multiple of, the user computing devices (314).

Figure 6:
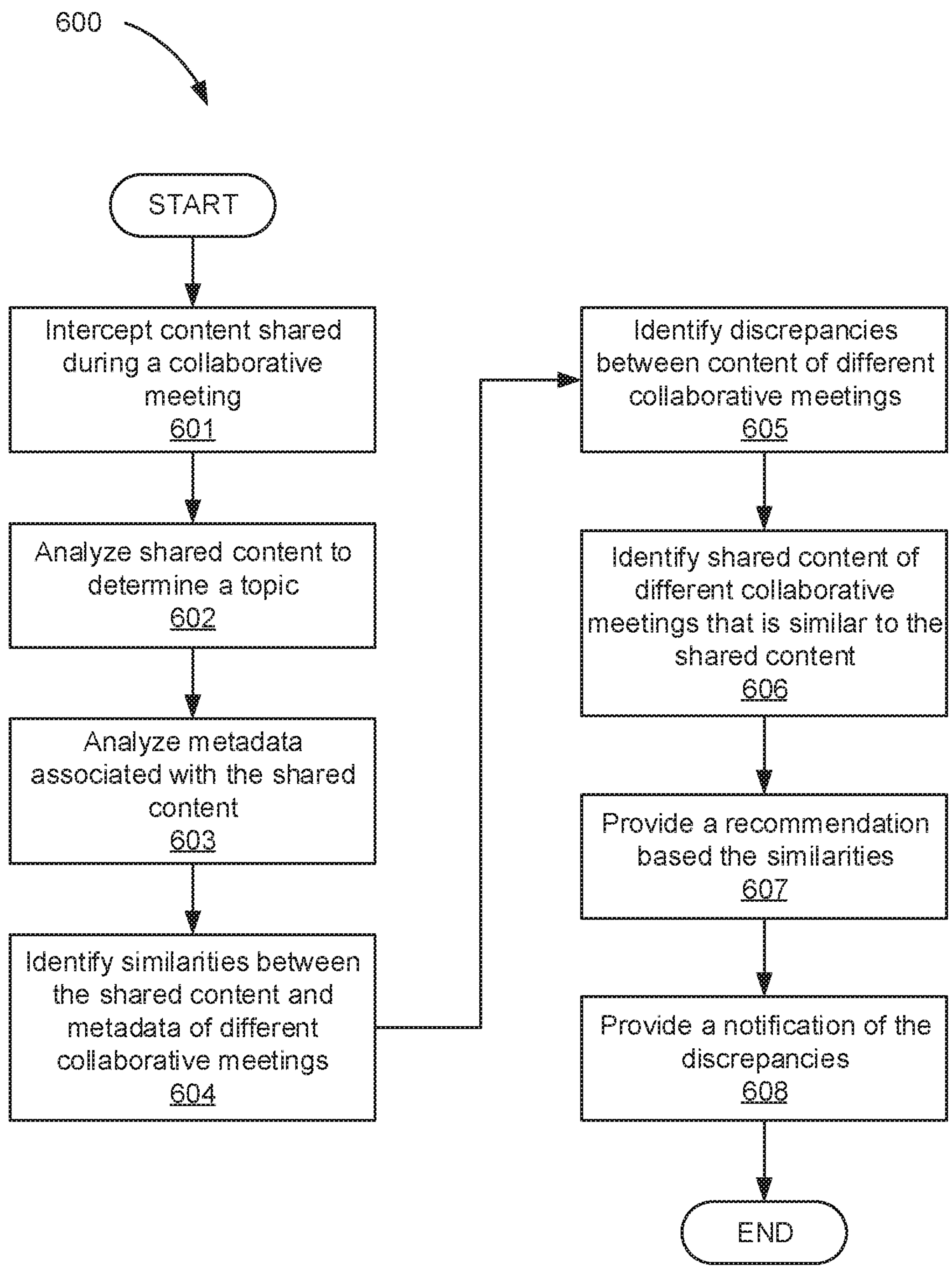
FIG. 6 is a flow chart of a method for shared content similarity analysis, according to another example of the principles described herein.

FIG. 6 is a flow chart of a method (600) for shared content similarity analysis, according to an example of the principles described herein. According to the method (600), content shared during a collaborative meeting is intercepted (block 601) and analyzed (block 602) to determine a subject, or topic, of the shared content. In some examples, these operations may be performed as described above in connection with FIG. 2.

In addition to analyzing (block 602) the shared content, the content tracking system (FIG. 1, 100) may analyze (block 603) metadata associated with the shared content. For example, each collaborative meeting may have a calendar event associated with it and the calendar event may have an attendee list. This attendee list may be another indication of similarity between different collaborative meetings. For example, if a particular collaborative meeting is related to the same topic and has at least a portion of similar attendees, it may be further evidence that the collaborative meetings are similar in their content/topic and that collaboration on this front would advance progress. While particular reference is made to analyzing (block 603) attendee-based metadata, other forms of metadata may also be useful and accordingly analyzed (block 603).

Similarities are then identified (block 604) between the shared content and metadata of different collaborative meetings. That is, as described above, the content comparer (FIG. 1, 108) and a metadata comparer can determine how the shared content and metadata associated with different collaborative meetings relate to one another.

In addition to identifying (block 604) similarities, the content tracking system (FIG. 1, 100) may identify (block 605) discrepancies between the content of different collaborative meetings. Such discrepancies may be helpful in determining whether collaborative meetings are similar, or may be relevant once meetings have been declared to be similar.

For example, a first collaborative meeting and second collaborative meeting may share certain characteristics such as relating to automobiles. However, the discrepancies may be such that the two are determined to be dissimilar and that collaboration would not necessarily be justified. For example, the first collaborative meeting may relate to an engine component of the automobile and the second collaborative meeting may relate to a paint formulation for the automobile. While both are similar in that they relate to the automobile, the discrepancy of one being related to an engine component and the other to a paint formulation may be significant enough to not classify the different meetings as related to one another.

In another example, the discrepancies may not lead to a separate classification of the meetings, but may be noted and helpful at a later point in time. For example, a first group may be addressing an issue one way while a second group is meeting and addressing the same issue a different way. In this example, it could be noted to the two groups that they are working on the same issue, and then each group may be notified how the other group has addressed the issue, which could enhance the efforts of either, or both, groups.

As yet another example, identified discrepancies (block 605) may lead to the identification of misinformation, such as outdated information. For example, a first group may be discussing a product release and using the version 1 of a product component. A second group may also be discussing the product release but using a version 2 of the same product component. Accordingly, identifying (block 605) the discrepancies may indicate to the first group that they are working on an out-of-date product component.

As described above, when a threshold similarity has been determined between different collaborative meetings, those meetings may be identified (block 606) as being similar. A recommendation is then provided (block 607) based on the similarities. As described above, in addition to providing a recommendation based on similarities, a notification may be provided (block 608) indicating the discrepancies between collaborative meetings. In some examples, the recommendation may be provided (block 607) via a different or the same channel than the notification that is provided (block 608). For example, the recommendation may be provided to one user and the notification of a discrepancy may be provided to the same user, or a different user.

Figure 7:
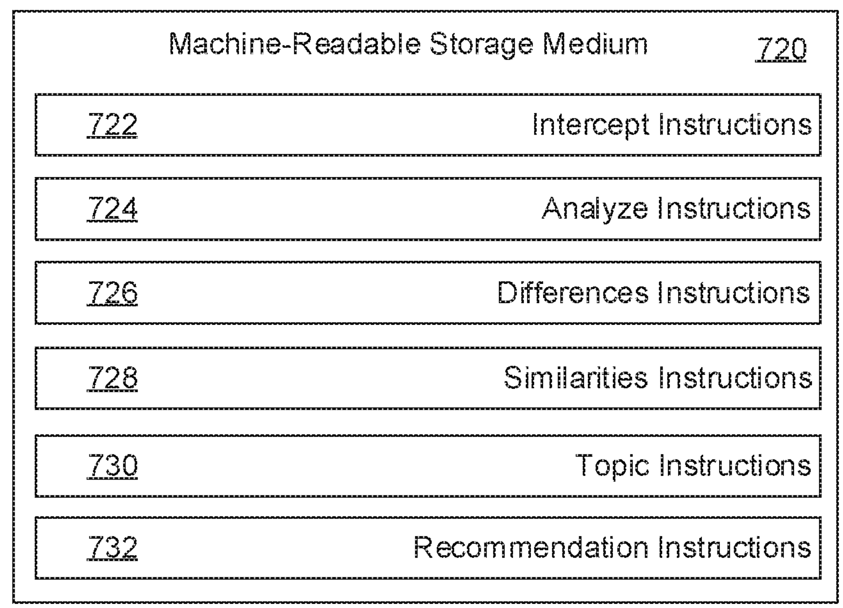
FIG. 7 is a diagram of a machine-readable storage medium for shared content similarity analysis, according to an example of the principles described herein.

FIG. 7 is a diagram of a machine-readable storage medium (720) for shared content similarity analysis, according to an example of the principles described herein. To achieve its desired functionality, a computing system includes various hardware components. Specifically, the computing system includes a processor. Machine-readable storage medium (720) is communicatively coupled to the processor. The machine-readable storage medium (720) includes a number of instruction sets (722, 724, 726, 728, 730, 732) for performing a designated function. The machine-readable storage medium (720) causes the processor to execute the designated function of the instruction sets (722, 724, 726, 728, 730, 732).

Although the following descriptions refer to a single machine-readable storage medium (720), the descriptions may also apply to multiple machine-readable storage mediums. In such examples, the instruction sets (722, 724, 726, 728, 730, 732) may be distributed (e.g., stored) across multiple machine-readable storage mediums.

The machine-readable storage medium (720) represents any tangible and non-transitory memory capable of storing data such as programmed instructions or data structures used by the computing system.

Referring to FIG. 7, intercept instructions (722), when executed by a processor, may cause the computing system to, intercept, at a computing device, content shared via another computing device during a collaborative meeting. Analyze instructions (724), when executed by a processor, may cause the computing system to analyze the shared content. Difference instructions (726), when executed by a processor, may cause the computing system to determine differences between the shared content of the collaborative meeting and shared content of other collaborative meetings. Similarities instructions (728), when executed by a processor, may cause the computing system to determine similarities between the shared content of the collaborative meeting and shared content of other collaborative meetings. Topic instructions (530), when executed by a processor, may cause the computing system to determine that the collaborative meeting relates to a same topic as at least one of the other collaborative meetings based on a threshold degree of similarity between respective shared content. Recommendation instructions (732), when executed by a processor, may cause the computing system to provide participants in at least one of the collaborative meeting and the at least one other collaborative meeting with a recommendation based on a determined similarity.

In summary, using such a content tracking system 1) allows for effective identification of related collaborative groups; 2) facilitates coordinated efforts of related collaborative groups; 3) more effectively manage efforts of multiple collaborative groups; and 4) promotes more effective collaboration and the attendant business ideals such collaboration espouses.

What is claimed is:

1. A content tracking system, comprising:

one or more processors; and one or more non-transitory computer-readable storage media having instructions stored thereon that, when executed by the one or more processors, cause the one or more processors to implement operations comprising:

intercepting, via a network, first shared content comprising a first video file that is shared from a first conferencing computing device during a first collaborative meeting including a first individual;

intercepting, via the network, second shared content comprising a second video file that is shared from a second conferencing computing device during a second collaborative meeting including a second individual;

analyzing the first shared content and the second shared content using a neural network to determine a common topic of the first collaborative meeting and the second collaborative meeting; and providing a collaboration recommendation to the first individual, wherein the collaboration recommendation recommends that the first individual contacts the second individual about the common topic, the first collaborative meeting does not include the second individual, and the second collaborative meeting does not include the first individual.

2. The system of claim 1, wherein:

intercepting the first shared content comprises intercepting, at a server, a first presentation file and the first video file shared from the first conferencing computing device during the first collaborative meeting; and intercepting the second shared content comprises intercepting, at the server, a second presentation file and the second video file shared from the second conferencing computing device during the second collaborative meeting.

3. The system of claim 1, wherein:

analyzing the first shared content and the second shared content comprises analyzing metadata associated with the first shared content and the second shared content; and providing the collaboration recommendation comprises providing the collaboration recommendation based at least in part on results of analyzing the metadata.

4. The system of claim 1, the operations further comprising:

identifying discrepancies between the first shared content and the second shared content; and providing a notification to the first individual or the second individual of the discrepancies.

5. The system of claim 1, wherein providing the collaboration recommendation to the first individual comprises providing the collaboration recommendation to the first individual during the first collaborative meeting.

6. The system of claim 1, wherein the content tracking system is disposed on a server and is coupled to the first conferencing computing device and the second conferencing computing device via the network.

7. The system of claim 1, wherein the collaboration recommendation provides contact information for the second individual to the first individual.

8. The system of claim 1, wherein the analyzing the neural network comprises an unsupervised neural network.

9. The system of claim 1, wherein the first shared content comprises a recording of the first collaborative meeting.

10. The system of claim 1, wherein analyzing the first shared content and the second shared content comprises at least one of:

performing image recognition to determine the common topic;

performing textual recognition to determine the common topic; or performing voice recognition to determine the common topic.

11. A computer-implemented method, comprising:

intercepting first shared content comprising a first video file that is shared from a first conferencing computing device during a first collaborative meeting including a first individual;

intercepting second shared content comprising a second video file that is shared from a second conferencing computing device during a second collaborative meeting including a second individual;

analyzing the first shared content and the second shared content using a neural network to determine a common topic associated with both the first collaborative meeting and the second collaborative meeting;

notifying the first individual about one or more participants of the second collaborative meeting associated with the common topic; and providing a collaboration recommendation to the first individual that recommends that the first individual contacts the second individual about the common topic, wherein the first collaborative meeting does not include the second individual and the second collaborative meeting does not include the first individual.

12. The method of claim 11, further comprising:

identifying discrepancies between the first shared content and the second shared content; and providing a notification to the first individual or the second individual of the discrepancies.

13. The method of claim 11, wherein providing the collaboration recommendation to the first individual comprises providing the collaboration recommendation to the first individual during the first collaborative meeting.

14. The method of claim 11, wherein:

analyzing the first shared content and the second shared content comprises analyzing metadata associated with the first shared content and the second shared content; and providing the collaboration recommendation comprises providing the collaboration recommendation based at least in part on results of analyzing the metadata.

15. The method of claim 14, wherein:

the metadata comprises an attendee list; and providing the collaboration comprises providing the collaboration recommendation based on determining that the second individual attended the first different collaborative meeting.

16. The method of claim 11, further comprising classifying the first collaborative meeting and the second collaborative meeting based on the common topic.

17. The method of claim 11, wherein notifying the first individual about the one or more participants of the second collaborative meeting comprises notifying the first individual about the second individual.

18. A tangible machine-readable storage medium encoded with instructions executable by a processor, the machine-readable storage medium comprising:

instructions to intercept, via a network at a server, first shared content comprising a first video file that is shared from a conferencing computing device during a first collaborative meeting including a first individual;

instructions to intercept, via the network at the server, second shared content comprising a second video file that is shared from the conferencing computing device during a second collaborative meeting including a second individual;

instructions to determine that the first collaborative meeting relates to a same topic as the second collaborative meeting content using a neural network based on a threshold degree of similarity between the first shared content and the second shared content;

instructions to notify the first individual about participants of the second collaborative meeting responsive to determining that the first collaborative meeting relates to the same topic as the second collaborative meeting; and instructions to provide a collaboration recommendation to the first individual, wherein the collaboration recommendation recommends that the first individual contacts the second individual about the same topic relating to the first collaborative meeting and the second collaborative meeting, the first collaborative meeting does not include the second individual, and the second collaborative meeting does not include the first individual.

19. The machine-readable storage medium of claim 18, comprising instructions to analyze metadata associated with the first shared content and the second shared content, wherein the instructions to provide the collaboration recommendation comprise instructions to provide the collaboration recommendation based at least in part on results of analyzing the metadata.

20. The machine-readable storage medium of claim 18, wherein the first shared content comprises at least one of:

a video presentation;

an audio presentation;

a textual presentation;

a multimedia presentation;

audio capture from the first collaborative meeting; or video capture from the first collaborative meeting.

* * * * *